W. DALE.

Illuminating Vault-Covers.

No. 5,684. Reissued Dec. 16, 1873.

Witnesses.
A. Rupper
Edw. J. Bils

Wm Dale
Inventor.
by
D. P. Holloway & Co
Attys.

A.H. PHOTO-LITHOGRAPHIC Co. N.Y. (OSBORNE'S PROCESS)

UNITED STATES PATENT OFFICE.

WILLIAM DALE, OF NEW YORK, N. Y., ASSIGNOR OF TWO-THIRDS INTEREST TO WILLIAM S. O'BRIEN.

IMPROVEMENT IN ILLUMINATING VAULT-COVERS.

Specification forming part of Letters Patent No. 112,428, dated March 7, 1871; reissue No. 5,684, dated December 16, 1873; application filed November 12, 1873.

*To all whom it may concern:*

Be it known that I, WILLIAM DALE, of the city, county, and State of New York, have invented a new and useful Improvement in Covers for Openings in Side-Walks; and I do hereby declare that the following is a full, clear, and exact description of the same, reference being had to the annexed drawings making part of this specification, in which—

Figure 1:
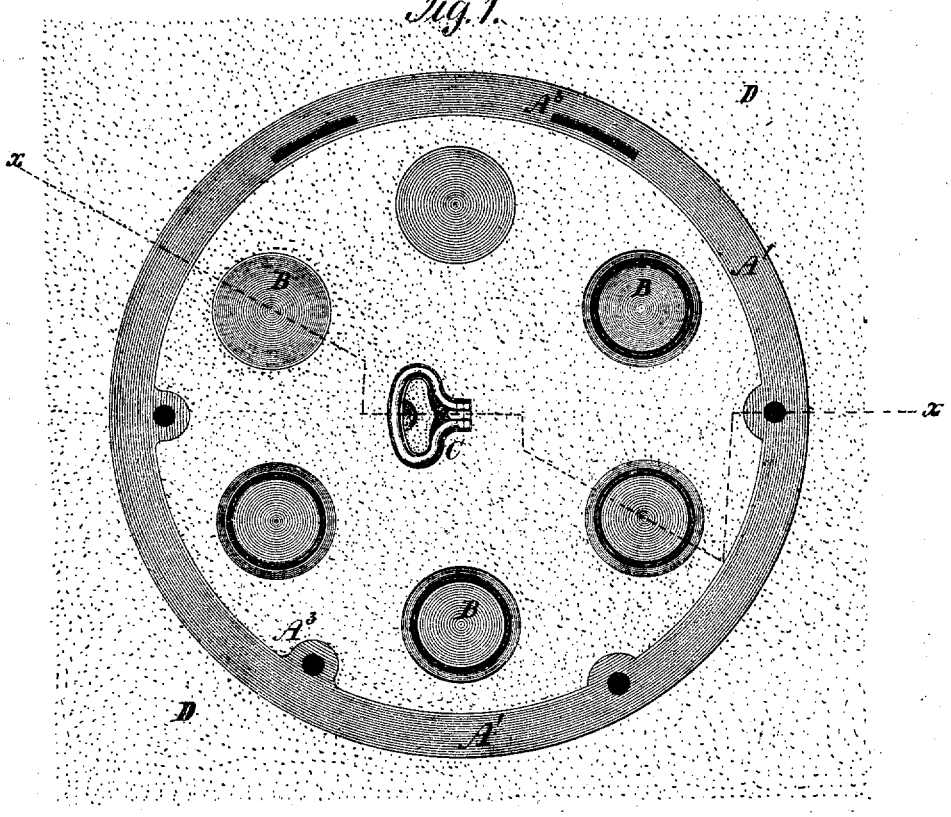
Figure 2:
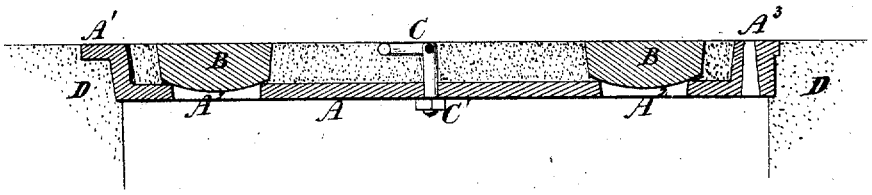

Figure 1 is a plan view, and Fig. 2 is a vertical section on the line *x x* of Fig. 1.

The same letters are employed in both the figures in the indication of identical parts.

This invention relates to such covers as are used for covering openings into vaults; and my improvement consists in making the surface of the cover within the narrow annular metallic ring of a material which is not slippery, inclosing glass bull's-eyes fitted over holes in the metallic dish and held in place by the surrounding material. Also, in forming holes through the metallic rim, when it is desirable that such a cover should have openings for ventilation.

Such illuminating vault-covers have heretofore been made by using a frame of cast-iron, with cross-bars like a window-sash. Bull's-eyes were then inserted in the openings and secured in place by a suitable plastic material filling the narrow spaces between the bars and the glass bull's-eyes. The bars were flush with the surface of the glass, and liable to become polished from use, and thus afford an insecure foothold. Besides this, the iron, expanding more than the glass when exposed to the intense heat of the sun, the bull's-eyes are liable to be crushed or forced out of their places.

To remedy the defects of the covers in former use, I use a dish of cast-iron, or other suitable metal, A, formed with a peripheral flange, $A^1$, to bear upon a seat formed in the pavement D. Holes at proper intervals, $A^2$, are formed to receive glass bull's-eyes B. These bull's-eyes are held in place by an intermediate filling, C, occupying the space between the bull's-eyes and the vertical rim of the dish, so that no part of the latter is exposed at the surface of the pavement except the annular rim $A^1$. This filling may be of wood or of such materials as are employed in making pavements, where suitable. A ring, C, attached to an eyebolt, C′, may be countersunk, so that when not in use it will be flush with the surface of the material used in filling the space between the bull's-eyes. For purposes of ventilation, openings as at $A^3$ may be formed through the vertical portion of the dish.

What I claim as my invention, and desire to secure by Letters Patent is—

1. A cover for openings in pavements, constructed of a metallic dish, A, having holes in the bottom plate $A^2$ and bull's-eyes B, which are surrounded by a material which, with the bull's-eyes, forms the entire upper surface within the rim $A^1$, substantially as described.

2. A cover for openings in pavements, constructed of a metallic dish, A, having holes in the bottom plate $A^2$, and bull's-eyes B, which are surrounded by a material which, with the bull's-eyes, forms the entire upper surface within the rim $A^1$, and also having openings for ventilation through the vertical portion of the metallic dish, substantially as described.

WILLIAM DALE.

Witnesses:
R. MASON,
B. EDW. J. EILS.